US012780451B1

(12) United States Patent
Tarnas et al.

(10) Patent No.: US 12,780,451 B1
(45) Date of Patent: Nov. 3, 2026

(54) REGOLITH THERMAL RADIATOR

(71) Applicant: Blue Origin Manufacturing, LLC, Huntsville, AL (US)

(72) Inventors: Jesse Dylan Tarnas, Los Angeles, CA (US); Morgan Leland Hendry, IV, Sherman Oaks, CA (US); Amelia Diane Greig, Los Angeles, CA (US)

(73) Assignee: Blue Origin Manufacturing, LLC, Huntsville, AL (US)

( * ) Notice: Subject to any disclaimer, the term of this patent is extended or adjusted under 35 U.S.C. 154(b) by 153 days.

(21) Appl. No.: 18/948,369

(22) Filed: Nov. 14, 2024

(51) Int. Cl.
*B64G 1/50* (2006.01)
*B28B 1/54* (2006.01)
*B28B 7/34* (2006.01)

(52) U.S. Cl.
CPC ................ *B64G 1/503* (2013.01); *B28B 1/54* (2013.01); *B28B 7/346* (2013.01)

(58) Field of Classification Search
CPC ............ B64G 1/503; B64G 1/54; B28B 7/346
See application file for complete search history.

(56) References Cited

U.S. PATENT DOCUMENTS

| | | | | | |
|---|---|---|---|---|---|
| 3,564,302 | A * | 2/1971 | Levedahl | G21H 1/106 | 136/202 |
| 5,086,828 | A * | 2/1992 | Ewert | B64G 1/50 | 136/246 |
| 2005/0279343 | A1* | 12/2005 | MacPherson | F24D 9/00 | 126/117 |
| 2013/0180191 | A1* | 7/2013 | Teron | E04B 5/48 | 52/220.1 |
| 2022/0009162 | A1* | 1/2022 | Ballard | B33Y 10/00 | |
| 2022/0274077 | A1* | 9/2022 | Brewer | B01J 6/008 | |
| 2023/0249408 | A1* | 8/2023 | Booker | B29C 64/255 | 264/211.21 |
| 2025/0144710 | A1* | 5/2025 | Oqab | B22F 3/1143 | |
| 2025/0318281 | A1* | 10/2025 | Tarnas | C23C 14/10 | |

FOREIGN PATENT DOCUMENTS

| | | | | | |
|---|---|---|---|---|---|
| GB | 2474444 | A | * | 4/2011 | F28F 21/045 |
| JP | 2026037900 | A | * | 3/2026 | |

OTHER PUBLICATIONS

Lunar Latitude and Terrain Radiator Sensitivity Study, Birmingham (Year: 2024).*

Thermal Energy Storage and Power Generation for the Manned Outpost using Processed Lunar Regolith as Thermal Mass Materials, Wegeng et al. (Year: 2009).*

* cited by examiner

*Primary Examiner* — Devon Lane
(74) *Attorney, Agent, or Firm* — Summit Patents PC

(57) ABSTRACT

A method and system is presented for producing a thermal radiator made from regolith, such as lunar regolith from the Moon's surface. Regolith generally comprises rough, irregular-shaped grains that collectively entrap pores and interstitial spaces, resulting in regolith's relatively low thermal conductivity. Solidified molten regolith, however, is a relatively homogeneous and continuous material having a much higher thermal conductivity. A method of fabricating a regolith thermal radiator may include forming a mold, melting regolith to form molten regolith, at least partially filling the mold with the molten regolith, and allowing the molten regolith to cool to a solid to form the thermal radiator. The mold may be formed in the Moon's surface by excavating lunar regolith where the thermal radiator is to be located. The molten regolith may then be cast in the mold.

20 Claims, 4 Drawing Sheets

REGOLITH THERMAL RADIATOR

BACKGROUND

Some of the key challenges of lunar colonization and other activities on the Moon are the cost and logistics of transporting materials from Earth to the Moon. To overcome this, scientists and engineers have been exploring the concept of in-situ resource utilization (ISRU), which involves using materials found on the moon to build infrastructure, produce fuel, and sustain life.

Activities on the Moon will likely give rise to the need for heat removal from various systems or components. For example, electronic components may generate heat during their operation and/or absorb heat from solar radiation. Similarly, fuel tanks may absorb heat from surrounding infrastructure and/or from solar radiation. Heat rejection or dissipation on the Moon's surface presents a unique challenge due to the absence of an atmosphere. Radiative methods may provide a favorable solution for heat rejection on the Moon, but the transportation of thermal radiators from Earth to the Moon is prohibitively expensive, leading to previous heat rejection methods resorting to water sublimators, for example, as seen in the Apollo missions.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

Figure 1:
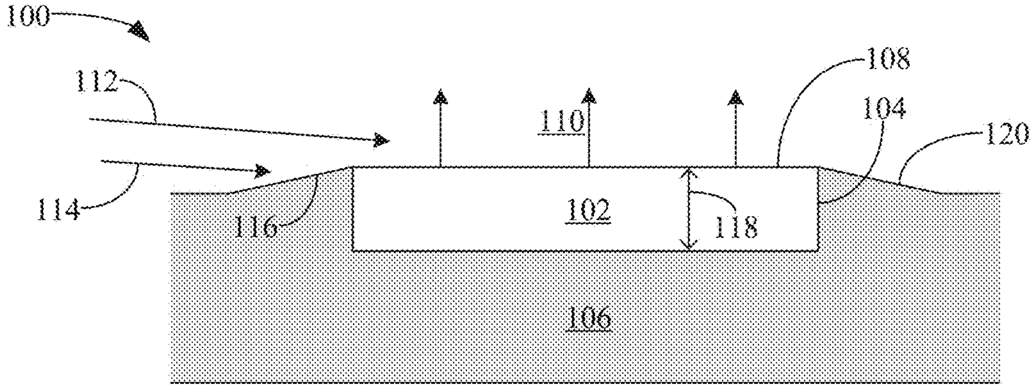
FIG. 1 is a schematic cross-section view of a regolith thermal radiator system, according to some embodiments.

This disclosure describes, among other things, a thermal radiator made from regolith, such as lunar regolith from the Moon's surface. Regolith generally comprises rough, irregular-shaped grains that collectively entrap pores and interstitial spaces, resulting in regolith's relatively low thermal conductivity. Solidified molten regolith, however, is a relatively homogeneous and continuous material having a much higher thermal conductivity. Still, solidified molten regolith's thermal conductivity is substantially less than that of metals, for example, which are generally used for thermal radiators. Embodiments described herein of a thermal radiator made from regolith involve a tradeoff between radiator efficiency and availability. For example, solidified molten regolith may not be the best-known material for a thermal radiator based on its thermal conductivity, but regolith is readily available on the lunar surface. Thus, expensive costs for transporting "better" materials (e.g., aluminum or other metals) for fabricating a thermal radiator may be avoided.

Described herein are a number of methods for forming or fabricating a thermal radiator made from lunar regolith. Though examples herein are directed to lunar regolith and methods performed on the Moon, claimed subject matter is not limited in this respect. For example, regolith or similar material from other bodies, such as Earth or Mars, may be used in the methods described herein.

In some embodiments, a method of fabricating a regolith thermal radiator may include forming a mold, melting regolith to form molten regolith, at least partially filling the mold with the molten regolith, and allowing the molten regolith to cool to a solid to form the thermal radiator. In some implementations, the mold may be formed in the Moon's surface by excavating lunar regolith where the thermal radiator is to be located. The molten regolith may then be cast in the mold. Hereinafter, "thermal radiator" indicates a thermal radiator that is made from regolith that has been melted and subsequently solidified, regardless of whether it was cast in place, such as in a mold, or formed in other ways, as described below.

The location and orientation of the thermal radiator is relatively important, particularly on the Moon's surface. Ideally, the thermal radiator is positioned or oriented to provide large radiative exposure to deep space and to minimize solar exposure. For this reason, in some implementations, a thermal radiator system may be located at or near polar regions of the Moon (or Earth or Mars). Sunlight strikes the polar regions at very low angles, casting long shadows. Thus, it may be relatively easy to block sunlight from reaching a thermal radiator by merely forming a berm or locating the thermal radiator behind (relative to the sun's direction) a hill or mound. Nearer to either of the Moon's poles, even though sunlight may be less likely to fall on a thermal radiator that is flat on the ground, it may be beneficial to provide a shadowing effect of a hill or mound, though these may be relatively small at such locations. If sunlight did fall on a thermal radiator near the Moon's poles, the sunlight would be at extreme grazing angles to the surface of the thermal radiator and incident sunlight flux on the surface would be near-zero.

In some implementations at or relatively near the lunar equator, to allow for greater exposure to deep space, after the molten regolith is cast to a solid, sides of the excavated regolith mold may be removed to expose the sides of the thermal radiator. In this way, a top and sides of a thermal radiator may be exposed to radiate heat to deep space.

FIG. 1 is a schematic cross-section view of a thermal radiator system 100, according to some embodiments. Thermal radiator system 100 includes a cast thermal radiator 102 disposed in a casting mold 104, which may be an excavated hole or trench in lunar surface material 106 (e.g., regolith). The thermal radiator may be solidified molten lunar regolith. At least one side 108 (e.g., the top) of thermal radiator 102 may be exposed to deep space, as indicated by arrows 110.

Thermal radiator 102 may be oriented on the surface of the Moon so that the thermal radiator is never, or minimally, exposed to direct sunlight. Arrow 112 indicates sunlight that may have a relatively low angle to the lunar surface at or in a polar region of the Moon. Such sunlight may strike thermal radiator 102 at a grazing angle and thus solar heating may be substantially small. Arrow 114 indicates sunlight at the same relatively low angle to the lunar surface that is blocked by a hill, mound, or berm 116. Such sunlight is thus prevented from striking thermal radiator 102 and solar heating of the thermal radiator is avoided.

In some implementations, thermal radiator 102 may be in the form of a relatively thin sheet having a thickness 118. Dimensions (e.g., thickness, surface area, and volume) may be based on a number of factors such as thermal conductivity and desired heat capacity of the thermal radiator and available footprint of the thermal radiator, just to name a few examples.

In some implementations, casting mold 104 may have a depth that is at least partially provided by built-up sides 120 (and 116). Thus, a desired thickness for casting thermal radiator 102 need not be achieved only by excavating a mold of the same depth, since a part of the mold depth may be built by forming a berm or other type of retaining structure.

Figure 2:
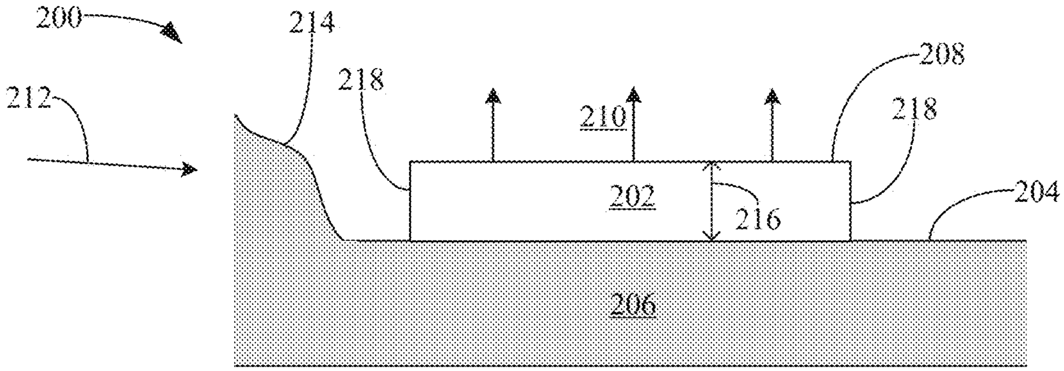
FIG. 2 is a schematic cross-section view of a regolith thermal radiator system, according to other embodiments.

FIG. 2 is a schematic cross-section view of a thermal radiator system 200, according to some embodiments. Thermal radiator system 200 includes a thermal radiator 202 disposed on a surface 204, which may be a bed of lunar regolith 206 in some examples. While both may be solidified molten lunar regolith, thermal radiator 202 may be different from thermal radiator 102 in that the latter is cast in place whereas the former may be cast in place or may be formed in another location and transported to the desired location. At least one side 208 of thermal radiator 202 may be exposed to deep space, as indicated by arrows 210. Thermal radiator 202 may be oriented on the surface of the Moon so that the thermal radiator is never, or minimally, exposed to direct sunlight. Arrow 212 indicates sunlight that may have a relatively low angle to the lunar surface at or in a polar region of the Moon. Moreover, such sunlight may be blocked by a hill, mound, or berm 214 that is natural or human-made. This sunlight is thus prevented from striking thermal radiator 102 and solar heating of the thermal radiator is avoided.

In some implementations, thermal radiator 202 may be in the form of a relatively thin sheet having a thickness 216, which may be the case if, for example, thermal radiator 202 was formed in a different location (e.g., not cast in place). Dimensions (e.g., thickness, surface area, volume) may be based on a number of factors such as thermal conductivity and desired heat capacity of the thermal radiator, available footprint of the thermal radiator, and structural strength needed for transportation (if not cast in place), just to name a few examples.

In some implementations, side(s) 218 may be exposed to increase overall thermal radiative ability of thermal radiator 202. If the thermal radiator is formed at a first location and transported to a second location, then the thermal radiator may likely be merely placed on the (lunar) surface. In this case, side(s) 218 will be exposed. On the other hand, if thermal radiator 202 is cast in place (e.g., with a form like 104), then side(s) 218 may only be exposed if sides of the form, which is most likely loose or unconsolidated regolith, are removed after the casting process. Because regolith is a very poor thermal conductor, unless melted and solidified, thermal radiation from surfaces of thermal radiator 202 that are in contact with regolith will generally be very low. In some implementations, the thermal conductivity of the radiator material (e.g., the regolith) may be altered by adjusting its cooling profile during fabrication. For example, a relatively slow cooling rate of regolith may lead to relatively large crystals and a faster cooling rate may lead to smaller crystals, wherein crystal size may be a factor in the thermal conductivity of the regolith.

Figure 3:
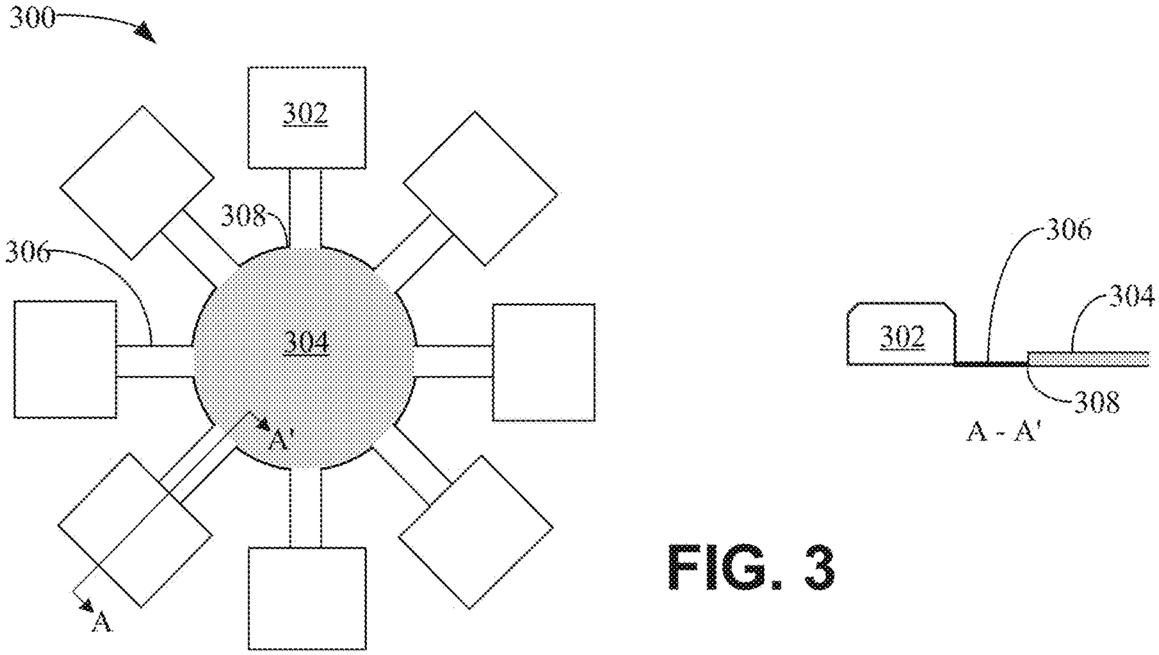
FIG. 3 is a schematic top view of multiple components connected to a regolith thermal radiator, according to some embodiments.

FIG. 3 is a schematic top view of a configuration 300 of multiple components 302 connected to a thermal radiator 304, according to some embodiments. The illustration in the right part of FIG. 3 is a cross-section view along line A-A'. Dimensions in these schematic views are not to scale and shapes are only of a schematic nature. Though eight components 302 are illustrated, any number of such components may instead be connected to thermal radiator 304 and the illustrated star configuration is merely an example. Claimed subject matter is not limited in this respect.

Components 302 may be any apparatus or system that needs cooling or benefits from cooling. Such apparatuses or systems may generate heat during their operation and/or attain heat via solar radiation absorption. One example is a habitat structure, which may benefit from cooling during the lunar day. Another example is a power generating system, such as solar panels or nuclear reactors, which will likely require cooling systems to operate efficiently. Yet another example is a water recycling system, which may generate heat during operation. Still another example is electronic equipment such as computers, communication devices, and other electronic equipment that generates heat during operation. Still another example is propellant production (e.g., cryogenic propellants) and its storage systems.

Each component 302 may be connected to thermal radiator 304 via a thermal path 306 and a thermal junction 308. Thermal path 306 may be a structure or material that is able to conduct heat over its length between component 302 and thermal radiator 304. Thus, a function of thermal path 306 is to remove heat from component 302 by transferring the heat away from component 302 to where the heat can be dissipated, such as at thermal radiator 304. In some implementations, thermal path 306 may be made of the same material as thermal radiator 304, which is regolith that has been melted and solidified. Thermal junction 308 may be any of several types of configurations that thermally tie together thermal radiator 304 and thermal path 306 (such as a distal end of the thermal path). For example, thermal junction 308 may comprise bolts or other types of attachment elements that thermally connect thermal path 306 to thermal radiator 304. In another example, thermal junction 308 may comprise a portion, such as a distal end or termination, of thermal path 306 being embedded in thermal radiator 304, as described below. In yet another example, in the case where thermal path 306 is made of the same material as thermal radiator 304, thermal junction 308 may merely be the continuity junction of thermal path 306 and thermal radiator 304.

Figure 4:
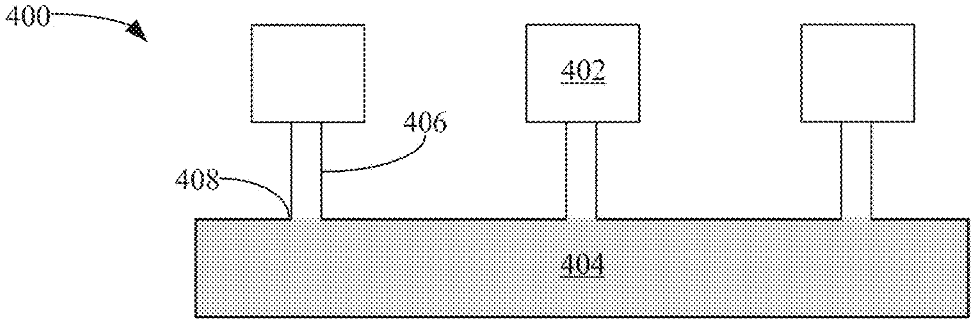
FIG. 4 is a schematic top view of multiple components connected to a regolith thermal radiator, according to other embodiments.

FIG. 4 is a schematic top view of a configuration 400 of multiple components 402 connected to a thermal radiator 404, according to some embodiments. Dimensions in this schematic view is not to scale. Though three components 402 are illustrated, any number of such components may instead be connected to thermal radiator 404 and configuration 400 is merely an example. Claimed subject matter is not limited in this respect.

As for components 302, components 402 may be any apparatus or system that needs cooling or benefits from cooling. Such an apparatus or system may be a habitat structure, a power generating system, a water recycling system, or electronic equipment, just to name a few examples.

Each component 402 may be connected to thermal radiator 404 via a thermal path 406 and a thermal junction 408. As for thermal path 306, thermal path 406 may be a structure or material that is able to conduct heat over its length between component 402 and thermal radiator 404. Thus, a function of thermal path 406 is to remove heat from component 402 by transferring the heat away from component 402 to where the heat can be dissipated, such as at thermal radiator 404.

Figure 5:
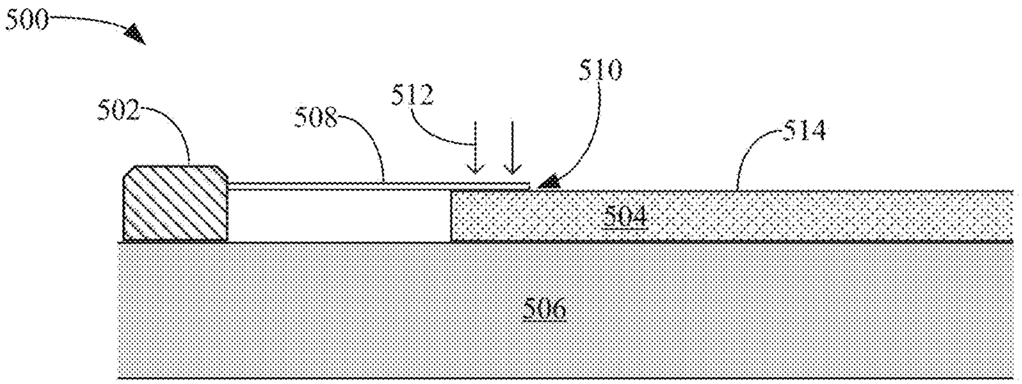
FIG. 5 is a schematic cross-section side view of a component connected to a regolith thermal radiator, according to some embodiments.

FIG. 5 is a schematic cross-section side view of a portion of a thermal radiator system 500 that includes a component 502 connected to a thermal radiator 504, according to some embodiments. Thermal radiator 504 is disposed on lunar surface 506 in this example but may be disposed on another surface, such as a human made foundation or other structure, in some implementations. Claimed subject matter is not so limited. Component 502 may be the same as or similar to components 302 or 402 and a thermal path 508 may be the same as or similar to thermal paths 306 and 406, for example. A thermal junction 510, which may be the same as or similar to thermal junctions 308 or 408, may comprise any of several possible connections. For example, thermal junction 510 may comprise bolts 512 or other connecting elements to tie thermal path 508 to thermal radiator 504. In some implementations, a thermal-conducting paste or compound (not illustrated) may be sandwiched between thermal path 508 and a surface 514 of thermal radiator 504 to improve thermal conductivity at the joint.

Figure 6:
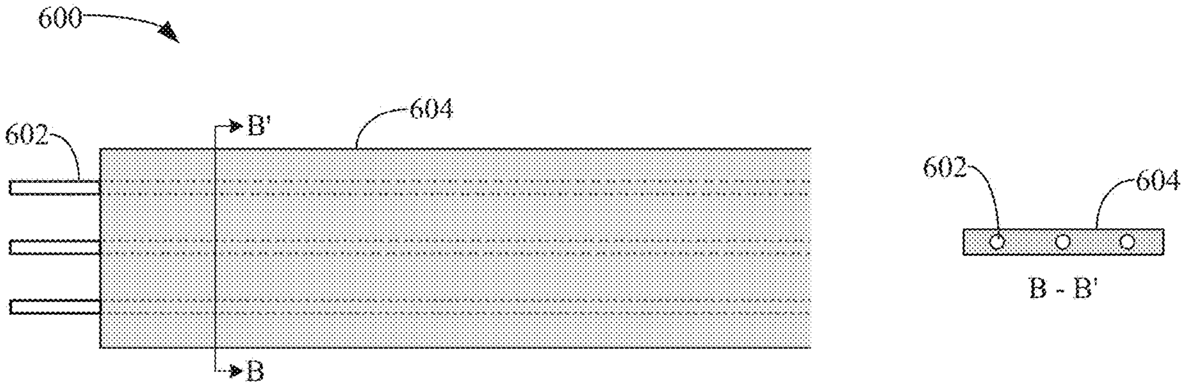
FIG. 6 is a schematic top view of thermal radiating tubes in a regolith thermal radiator, according to some embodiments.

FIG. 6 is a schematic top view of a portion of a thermal radiator system 600 that includes thermal radiating tube(s) 602 embedded in a thermal radiator 604, according to some embodiments. The illustration in the right part of FIG. 6 is a cross-section view along line B-B'. Dimensions in these schematic views are not to scale. Though three tubes 602 are illustrated, any number of such tubes may instead be embedded or encased in thermal radiator 604. Claimed subject matter is not limited in this respect.

Thermal radiating tube(s) 602 are tubes or pipes that are configured to carry a fluid (e.g., liquid or gas), which may be circulating from a hot source, such as any of components 302, 402, or 502, and loop through thermal radiator 604 as a heat sink. Tube(s) 602 may be made of a thermally conducting material such as a metal (e.g., aluminum). During operation, heat from fluid in tube(s) 602 may flow through the wall of the tube(s) and into thermal radiator 604. This heat may eventually flow to surfaces of thermal radiator 604 where it may radiate into space from surfaces that are exposed thereto.

Figure 7:
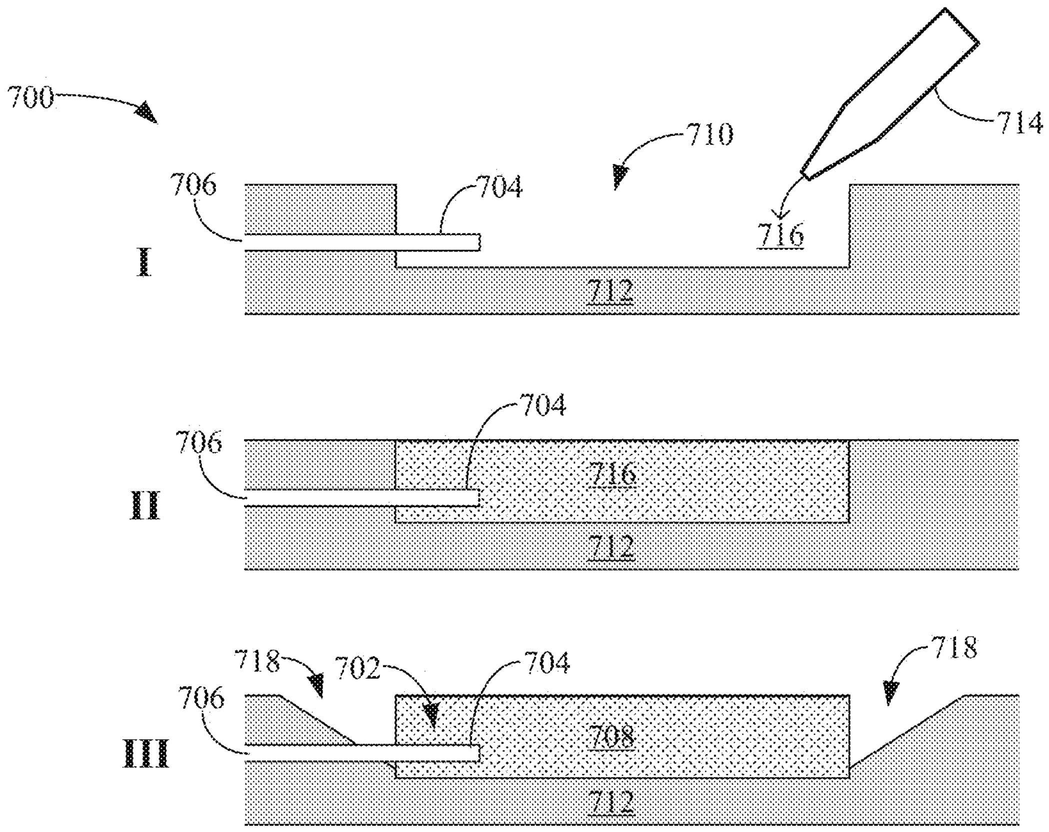
FIG. 7 is a schematic cross-section side view of a process of assembling a thermal radiating tube in a regolith thermal radiator, according to some embodiments.

FIG. 7 is a schematic cross-section side view of a process 700 of assembling a thermal junction 702 of a distal end 704 of a thermal path 706 (e.g., similar to or the same as 306, 406, or 508) that is embedded into a thermal radiator 708, according to some embodiments. In some particular implementations, process 700 may instead involve a thermal radiating tube, such as 602, that is to be embedded in the thermal radiator. In the latter case, the tube may extend across at least a portion of the space of the mold, described below, that will be used to form thermal radiator 708.

Three portions, I, II, and III of process 700 are illustrated but other steps or events may occur between any of these portions and claimed subject matter is not limited in this respect. At portion I, a mold 710 is formed, perhaps by excavating regolith 712 from the lunar surface. As illustrated, a portion of thermal path 706 may be exposed inside mold 710. A dispenser 714 may be configured to dispense molten regolith 716 to at least partially fill mold 710. At portion II, mold 710 is at least partially filled with molten regolith 716 that encases distal end 704 of thermal path 706. At portion III, molten regolith 716 cools and solidifies to form cast thermal radiator 708, which includes an embedded portion of thermal path 706, thus forming thermal junction 702. In some implementations, sides 718 of mold 710 may be removed to expose one or more sides of thermal radiator 708 to increase the total area from which thermal radiation can occur.

Figure 8:
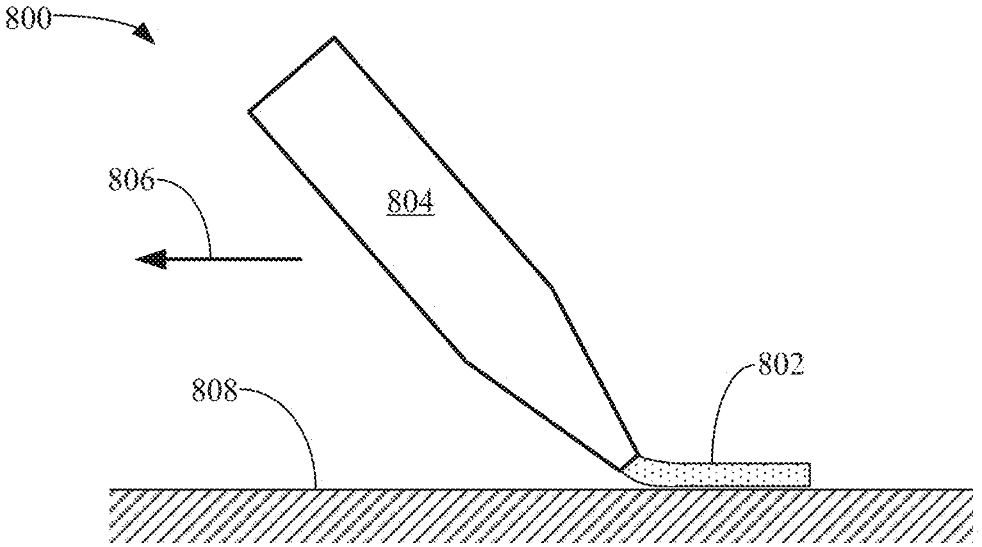
FIG. 8 is a schematic side view of a process of extruding molten regolith to form a regolith thermal radiator, according to some embodiments.

FIG. 8 is a schematic side view of a process 800 of extruding molten regolith 802 to form a thermal radiator, according to some embodiments. For example, process 800 may be used to form any of the thermal radiators described above. Cast thermal radiators (e.g., 102 and 708), however, need not be formed by process 800.

A dispenser 804 may produce an extrusion of molten regolith 802 that may be formed into an extended bead or filament as the dispenser moves in a direction indicated by arrow 806. Among other possible applications, the extrusion of molten regolith may be used for constructing a thermal radiator by way of 3D printing or additive fabrication, particularly if the extrusion is formed as an extended bead. The extruded molten regolith subsequently cools to a solid on a surface 808 to which it is applied.

Figure 9:
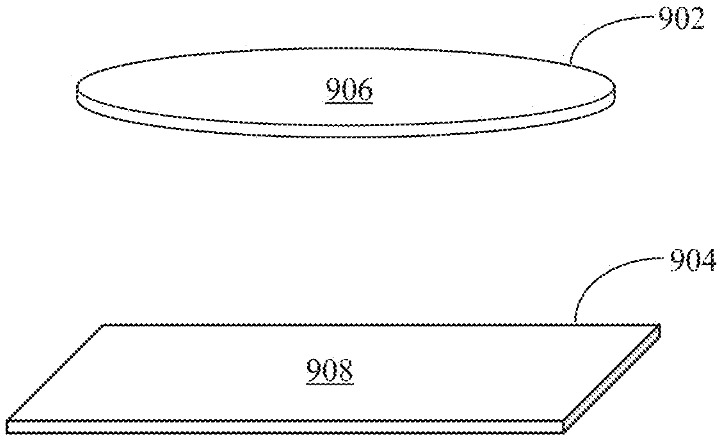
FIG. 9 illustrates two example regolith thermal radiators.

FIG. 9 illustrates two example thermal radiators 902 and 904. Both thermal radiators may be formed by casting in a mold or by additive fabrication (e.g., 3D printing). Generally top surfaces 906 and 908 of the thermal radiators are exposed to space while the opposite bottom surfaces are disposed on the lunar surface.

Figure 10:
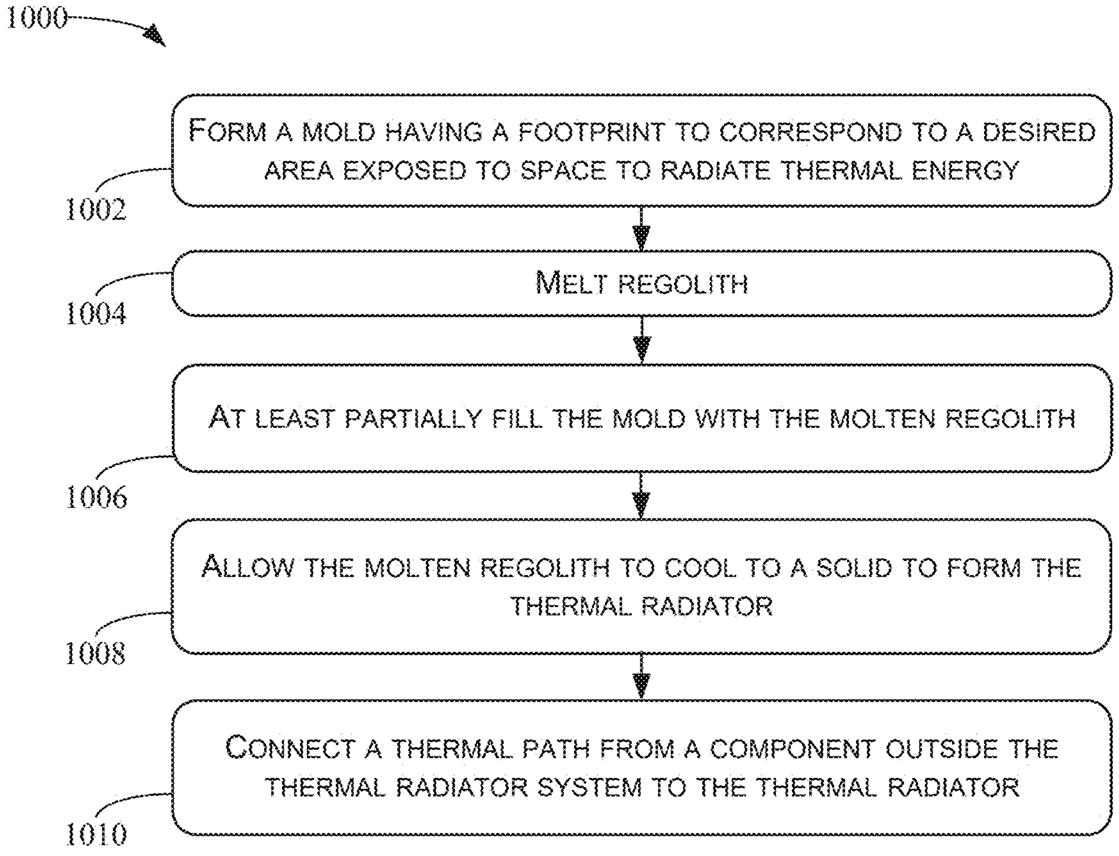
FIG. 10 is a flow diagram of a process for fabricating a regolith thermal radiator according to some embodiments.

FIG. 10 is a flow diagram of a process 1000 for fabricating a cast thermal radiator system, according to some embodiments. The process may be performed by an operator, which may be a person or persons, a computer processor executing computer-readable code, or a combination thereof. At 1002, the operator may form a mold having a footprint to correspond to a desired area exposed to space to radiate thermal energy. At 1004, the operator may melt regolith to form molten regolith. At 1006, the operator may at least partially fill the mold with the molten regolith, as illustrated in portion II of process 700, for example. At 1008, the operator may allow the molten regolith to cool to a solid to form the thermal radiator. At 1010, the operator may connect a thermal path from a component outside the thermal radiator system to the thermal radiator. An example of this may be portion III of process 700.

The foregoing description, for purposes of explanation, used specific nomenclature to provide a thorough understanding of the disclosure. However, it will be apparent to one skilled in the art that the specific details are not required in order to practice the systems and methods described herein. The foregoing descriptions of specific embodiments or examples are presented by way of examples for purposes of illustration and description. They are not intended to be exhaustive of or to limit this disclosure to the precise forms described. Many modifications and variations are possible in view of the above teachings. The embodiments or examples are shown and described in order to best explain the principles of this disclosure and practical applications, to thereby enable others skilled in the art to best utilize this disclosure and various embodiments or examples with various modifications as are suited to the particular use contemplated. It is intended that the scope of this disclosure be defined by the following claims and their equivalents.

We claim as follows:

1. A method of fabricating a thermal radiator system, the method comprising:

forming a mold;

melting regolith to form molten regolith;

at least partially filling the mold with the molten regolith;

allowing the molten regolith to cool to a solid to form a thermal radiator; and connecting a thermal path from a component outside the thermal radiator system to the thermal radiator.

2. The method of claim 1, wherein the regolith is lunar regolith.

3. The method of claim 1, further comprising excavating an area on the surface of the Moon to form the mold.

4. The method of claim 3, wherein the area on the surface of the Moon is in a polar region of the Moon.

5. The method of claim 1, further comprising constructing a berm adjacent to the mold.

6. The method of claim 1, further comprising, after allowing the molten regolith to cool to the solid, removing material at sides of the thermal radiator to expose the sides of the thermal radiator.

7. The method of claim 1, further comprising, before at least partially filling the mold with the molten regolith, placing one or more tubes in the mold, wherein the one or more tubes are configured to carry a fluid to be cooled.

8. The method of claim 1, wherein the thermal path comprises solidified molten regolith.

9. A method of fabricating a thermal radiator system, the method comprising:

melting regolith to form molten regolith;

extruding the molten regolith in a predetermined pattern;

allowing the molten regolith to cool to a solid to form the thermal radiator; and connecting a thermal path from a component outside the thermal radiator system to the thermal radiator.

10. The method of claim 9, wherein the regolith is lunar regolith.

11. The method of claim 9, further comprising excavating an area on the surface of the Moon to form a mold to receive the extruded molten regolith.

12. The method of claim 9, further comprising, before extruding the molten regolith, placing one or more tubes on a surface, wherein the one or more tubes are configured to carry a fluid to be cooled; and encasing the one or more tubes with the extruded molten regolith.

13. The method of claim 9, wherein the thermal path comprises solidified molten regolith.

14. A thermal radiator system comprising:

solidified molten lunar regolith, wherein the solidified molten lunar regolith is disposed on the surface of the Moon, at least one side of the solidified molten lunar regolith is exposed to deep space, and the solidified molten lunar regolith is oriented on the surface of the Moon so that the solidified molten lunar regolith is never exposed to direct sunlight.

15. The thermal radiator system of claim 14, wherein the surface of the Moon is in a polar region of the Moon.

16. The thermal radiator system of claim 14, wherein the solidified molten lunar regolith is in the form of a sheet.

17. The thermal radiator system of claim 14, wherein the solidified molten lunar regolith is further disposed in a trench on the surface of the Moon.

18. The thermal radiator system of claim 14, further comprising one or more tubes incased in the solidified molten lunar regolith, wherein the one or more tubes are configured to carry fluid to be cooled.

19. The thermal radiator system of claim 14, further comprising one or more thermal junctions connecting the solidified molten lunar regolith to one or more thermal conducting input paths configured to carry heat from a component outside the thermal radiator system.

20. The thermal radiator system of claim 19, wherein the one or more thermal conducting input paths comprise solidified molten regolith.

* * * * *